「12」 United States Patent  
Aldridge et al.

(10) Patent No.: US 6,922,684 B1  
(45) Date of Patent: Jul. 26, 2005

(54) ANALYTICAL-DECISION SUPPORT SYSTEM FOR IMPROVING MANAGEMENT OF QUALITY AND COST OF A PRODUCT

(75) Inventors: Bruce E. Aldridge, Oceanside, CA (US); Gerald L. Hill, Huntington Beach, CA (US); Craig I. Petz, San Diego, CA (US)

(73) Assignee: NCR Corporation, Dayton, OH (US)

( * ) Notice: Subject to any disclaimer, the term of this patent is extended or adjusted under 35 U.S.C. 154(b) by 595 days.

(21) Appl. No.: 09/652,974

(22) Filed: Aug. 31, 2000

(51) Int. Cl.[7] .............................................. G06N 5/04
(52) U.S. Cl. ............................. 706/60; 706/45; 706/46
(58) Field of Search ............................. 706/60, 45, 46

(56) References Cited

PUBLICATIONS

Dursun Delen; An Integrated Toolkit for Enterprise Modelinng and Analysis; 1999; ACM; 0–7803–5780–9; 289–297.*

* cited by examiner

Primary Examiner—Joseph P. Hirl  
(74) Attorney, Agent, or Firm—James M. Stover

(57) ABSTRACT

The present invention concerns an analytical-decision support system for improving management of quality and cost of a product throughout the entire product lifecycle of the product. The system comprises an atomic level data store for collecting data on component information, configuration information, and field information. A product-lifecycle-management analytics subsystem is included comprising: a query engine for compiling subsets of data from the atomic level data store; a first analysis tool for performing cost or quality analysis on the subsets to determine first analysis results; and a second analysis tool for analyzing detailed data in the atomic level data store to produce second analysis results. A management and operation subsystem is included for presenting the first analysis results after the first analysis tool performs the cost or quality analysis, and for presenting the second analysis results after the second analysis tool analyzes the detailed data. The management and operation subsystem further comprises: a user interface for receiving configuration data from a user for configuring the second analysis tool; and a warning notification subsystem for delivering warning notifications based on the first analysis results.

26 Claims, 2 Drawing Sheets

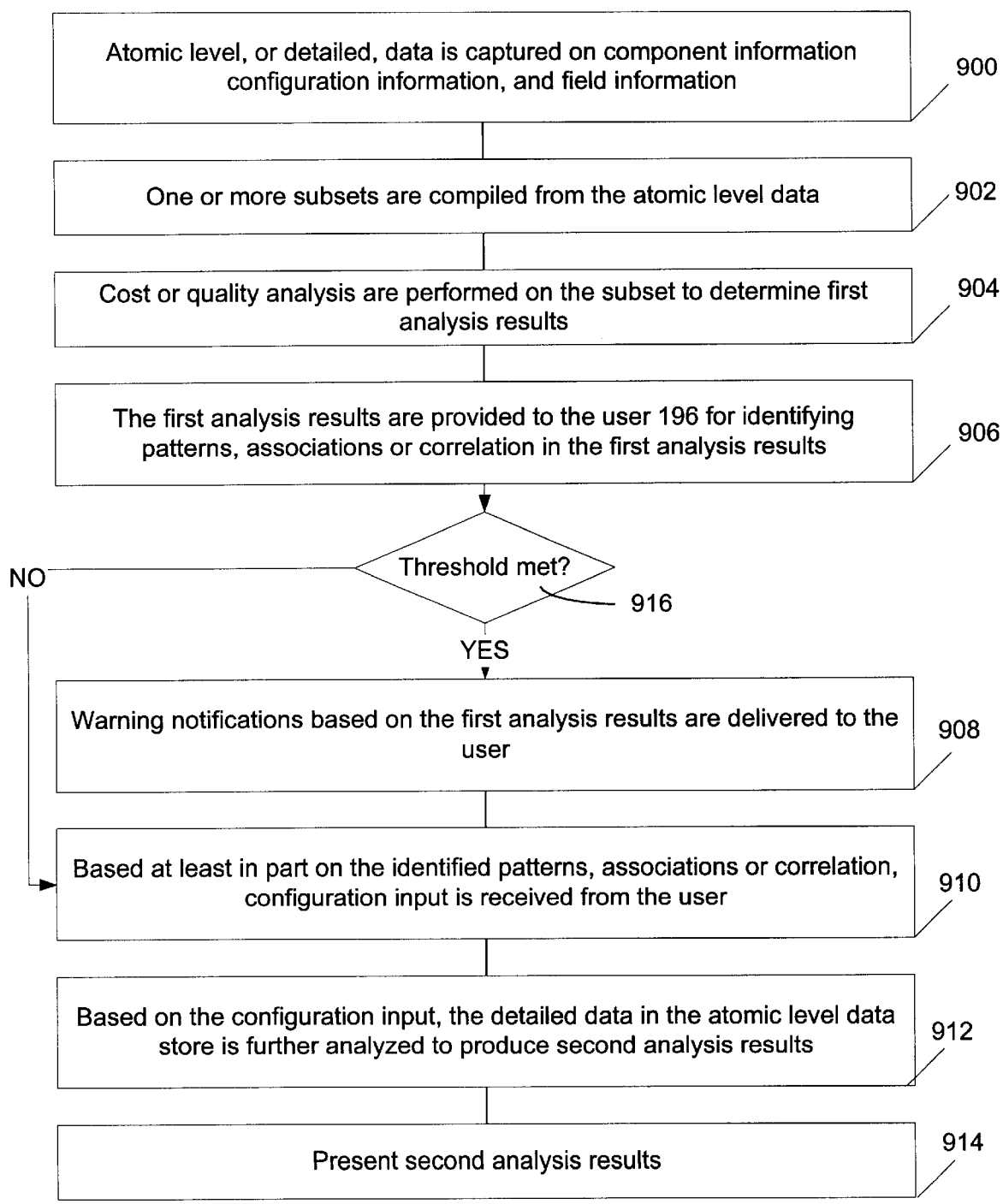

ANALYTICAL-DECISION SUPPORT SYSTEM FOR IMPROVING MANAGEMENT OF QUALITY AND COST OF A PRODUCT

FIELD OF THE INVENTION

The present invention concerns an analytical-decision support system for improving management of quality and cost of a product throughout the entire product lifecycle of the product. Specifically, the invention is a system and method for improving management of quality and cost of a product throughout the product lifecycle of the product by providing reiterative feed back to the system from a user.

BACKGROUND

Manufacturers lose a significant portion of their sales earnings each year to warranty and maintenance costs. Products such as computer equipment are made of numerous components that require multi-step assemblies, servicing, configuration, and maintenance. Defects in these areas increase inefficiencies in the product's lifecycle.

Manufacturers have attempted to minimize these inefficiencies. Teams from different backgrounds with diverse resources are often cross-referenced to manage cost and quality of a product. For example, in original equipment manufacturing, quality standard sharing, testing programs, and periodic reviews between departments and companies are used for quality management. While some success has been achieved, these processes generally deal with quality issues after the fact.

Because the end products are often highly complex, each component of a product may have an unexpected effect on other components of the product. In the computer industry, for example, consumers often return faulty equipment to manufacturers as provided in their sales warranties. Returned equipment is then diagnosed and returned to originators of the suspected component. Each supplier tests the returned component, but there is often nothing wrong with the component itself. Instead, equipment failure may have been caused by a particular configuration of the product. It may have been due to an incompatible hardware-hardware configuration, a hardware-software configuration, and/or a software-software configuration. The exact circumstances leading to the failure, however, is not easily duplicated after the fact. Because the exact source of the failure goes undetected, no correction is made to the production process.

Information from disparate systems and processes are generally not captured or retained for further analysis through the lifecycle of a product. Various stages are involved in the lifecycle of a product. They include, among others, manufacture, assembly, storage, software and hardware configuration, shipping and delivery, handling, sales, customer use, warranty service, and field service. Various information from disparate systems are available but are not utilized effectively.

Thus, there is a need to compile related data from disparate systems, to analyze the data in real time, and to provide analysis and decision-making support across the entire chain of product and service delivery. There is a need for a closed-loop quality information system that coordinates data captured through a complex production system's full lifecycle. There is a need for consolidating information from various component information, various configuration information, and various field information. There is a need for such data to improve management of product performance, management of service performance, management of supplier performance, analysis of performance results, identification of deviations from baseline activity, identification of root causes of deviations, feedback to engineering, feedback to manufacturing, feedback to service, improvements to quality visibility, and measurements of effectiveness of quality and cost efforts.

In an alternative method performed by the system for improving management of quality and cost of a product throughout the product lifecycle of the product, a method for providing reiterative feed back to the system from a user is provided. The method comprises the steps of: capturing atomic level data on component information, configuration information, and field information from one or more parties involved throughout the product lifecycle; compiling one or more subsets of data from the atomic level data; performing cost or quality analysis on the subset to determine first analysis results; providing the first analysis results to a user for identifying patterns, associations or correlation in the first analysis results; delivering warning notifications based on the first analysis results; based at least in part on the identified patterns, associations or correlation, receiving feedback data from the user; based on the feedback data, further analyzing detailed data in the atomic level data to produce second analysis results; and presenting the second analysis results.

SUMMARY OF THE INVENTION

The present invention concerns an analytical-decision support system for improving management of quality and cost of a product throughout the entire product lifecycle of the product. The system comprises an atomic level data store for collecting data on component information, configuration information, and field information.

A product-lifecycle-management analytics subsystem is included comprising: a query engine for compiling subsets of data from the atomic level data store; a first analysis tool for performing cost or quality analysis on the subsets to determine first analysis results; and a second analysis tool for analyzing detailed data in the atomic level data store to produce second analysis results.

A management and operation subsystem is included for presenting the first analysis results after the first analysis tool performs the cost or quality analysis, and for presenting the second analysis results after the second analysis tool analyzes the detailed data. The management and operation subsystem further comprises: a user interface for receiving configuration data from a user for configuring the second analysis tool; and a warning notification subsystem for delivering warning notifications based on the first analysis results.

The first analysis results may comprise one or more operational metrics or one or more cost or quality factors.

The second analytical tool may comprise a data mining tool.

The warning notification subsystem may be adapted to generate the warning notifications based on the one or more cost or quality factors meeting a threshold. The warning notification subsystem may further, or alternatively, be adapted to generate the warning notifications based on the one or more operational metrics meeting a threshold.

The operational metrics or cost or quality factors may be incorporated in a management dashboard for providing product lifecycle management information.

The atomic level data is supplied by parties involved throughout the lifecycle of the product. The parties may comprise one or more of suppliers, original equipment manufacturers, assembly manufacturers, field service providers, call centers, sales entities, and consumers The operational metrics, or cost or quality factors, relate to one or more stage(s) of the product lifecycle. The stages may comprise one or more of: design, manufacture, storage, assembly, configuration, shipping, delivery, handling, sales, support, and customer use.

The component information comprises one or more of supplier information, original equipment manufacturer information, component list information, manufacturing environment information, lot data, test results, picking data, packaging data, and shipping data. The configuration information comprises one or more of hardware-hardware configuration information, hardware-software configuration information, and software-software configuration information. The field information comprises one or more of field-test information, warranty information, repair information, technical support information, and technical service information.

The first analytical tool is adapted to generate one or more of: product management analysis, process management analysis, service supplier analysis, management analysis, component supplier analysis, warranty analysis, maintenance analysis, and forecasting analysis from the operational data store or atomic level data store.

The operational metrics may comprise a data model of the compiled data, said data model being derived by the product-lifecycle-management analytics subsystem based on at least a portion of the data from the atomic level data store. The operational metrics may also comprise an aggregated data model, said aggregated data model being aggregated from two or more data models derived by the product-lifecycle-management analytics subsystem based on at least a portion of the data from the atomic level data store.

The invention may also be regarded as a method of improving management of quality and cost of a product throughout the product lifecycle of the product. The method comprises a step of capturing atomic level data on component information, configuration information, and field information from one or more parties involved throughout the product lifecycle. One or more subsets of data are compiled from the atomic level data. Cost or quality analysis is performed on the subset to determine first analysis results. The first analysis results are provided to a user for identifying patterns, associations or correlation in the first analysis results. Warning notifications are delivered based on the first analysis results. Based at least in part on the identified patterns, associations or correlation, configuration input is received from the user. Based on the configuration input, detailed data in the atomic level data is further analyzed to produce second analysis results. The second analysis results are presented to the user.

BRIEF DESCRIPTION OF THE DRAWINGS

FIG. 2 is a flow diagram illustrating the steps performed in a process for improving management of quality and cost of a product throughout the entire lifecycle of the product using an analytical-decision support system according to the system of FIG. 1.

DETAILED DESCRIPTION OF THE INVENTION

Figure 1:
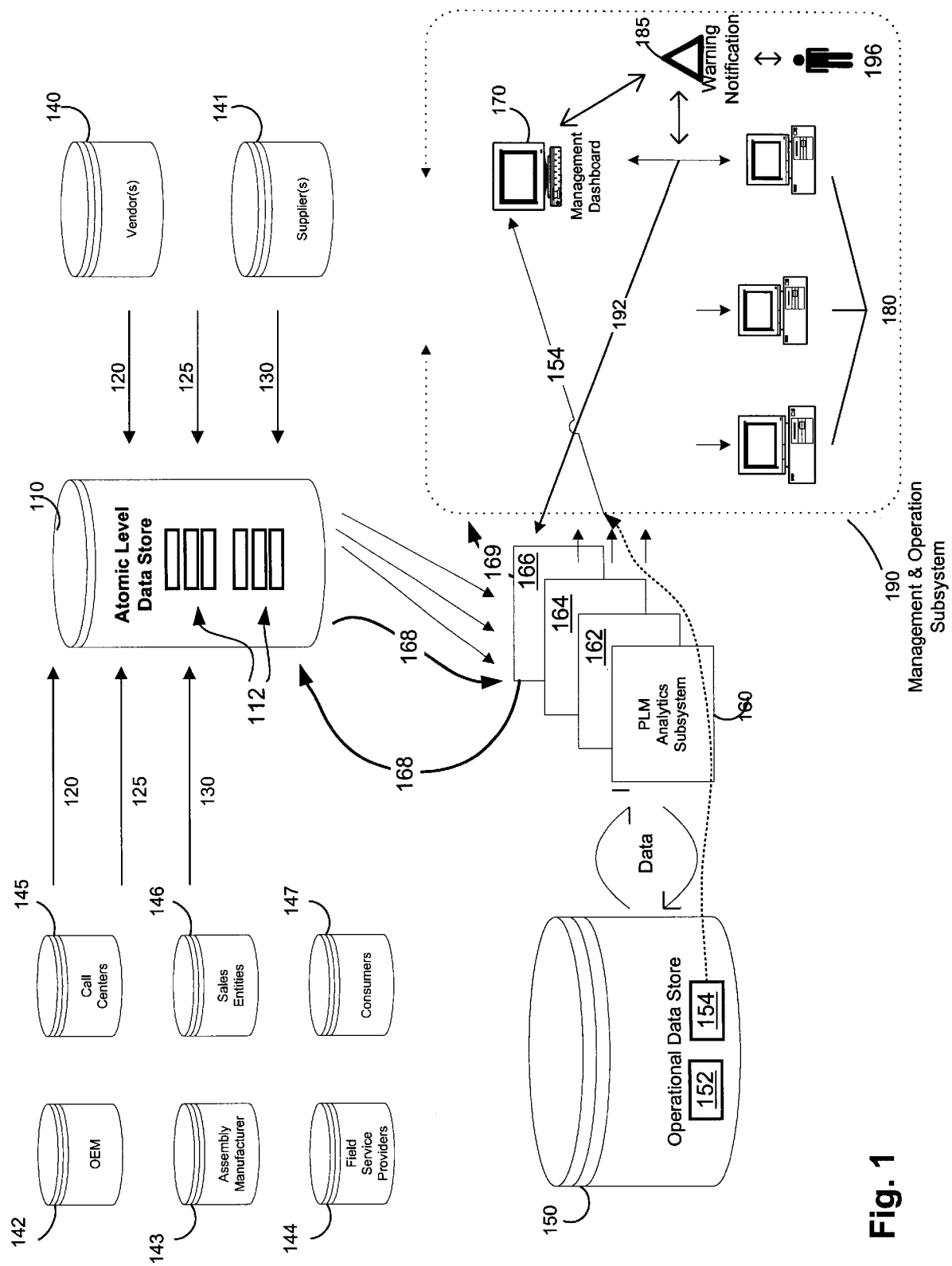
FIG. 1 is a block diagram showing an exemplary analytical-decision support system for improving management of quality and cost of a product throughout the entire lifecycle of the product.

With reference to FIG. 1, a block diagram showing a system architecture for an analytical-decision support system for improving management of quality and cost of a product throughout the entire product lifecycle of the product is shown. The various stages involved in the product's lifecycle may include, among others, component or subcomponent manufacture, components and subcomponents assembly, software and hardware configuration, shipping, delivery, storage, servicing, handling, sales, and/or customer use. The system comprises an atomic level data store 110 for collecting detailed, or atomic level, data 112 on component information 120, configuration information 125, and field information 130. A product-lifecycle-management analytics subsystem (PLM) 160 is included. The PLM 160 comprises a query engine 162 for compiling one or more subsets 152 of data from the atomic level data store 110. The subsets 152 may be stored in an operational data store 150. The PLM further comprises a first analysis tool 164 for performing cost or quality analysis on the subsets 152 to determine first analysis results 154. The PLM 150 further comprises a second analysis tool 166 for analyzing the detailed data 112 in the atomic level data store 110 to produce second analysis results 169.

A management and operation subsystem 190 is included for presenting the first analysis results 154 after the first analysis tool 164 performs the cost or quality analysis, and for presenting the second analysis results 169 after the second analysis tool 166 analyzes the detailed data 112, as shown by data path 168. The management and operation subsystem 190 further comprises one or more user interfaces, comprising a management dashboard 170, or processors with display screens 180, for receiving configuration data 192 from a user 196 for configuring the second analysis tool 166.

A warning notification subsystem 185 for delivering warning notifications based on the first analysis results 154 is further included with the management and operations subsystem 190. The warning notification subsystem 185 is adapted to deliver warnings to a user 196. The warning may be delivered by electronic mail (e-mail), voice mail, fax, a printer output device, the management dashboard 170, or processors 180.

The first analysis results 154 may comprise one or more operational metrics. Operational metrics are defined as manufacturing, shipping, storage, or other attributes of products or components. One example of an operational metric is the lead time between ordering of a product, and shipping of the product to an original equipment manufacturer (OEM). The first analysis results 154 may alternatively, or further, comprise one or more cost or quality factors. Cost or quality factors may include, for example, the average price of a component used to manufacture a product, or the line reject rate of a component included in a product.

The second analysis tool 166 may comprise one or more analytical tools as commonly used to analyze data in data warehouses. For example, the second analytical tool 166 may comprises a data mining tool that the user 196 may configure to find correlations in the detailed data 112 based on the warning notification received from the warning notification subsystem 185. Data mining methods are described in U.S. patent application Ser. No. 09/494,175, filed Jan. 31, 2000, titled METHOD USING STATISTICALLY ANALYZED PRODUCT TEST DATA TO CONTROL COMPONENT MANUFACTURING PROCESS, which is incorporated herein by reference. Data mining methods are also described in U.S. patent application Ser. No. 09/541,137, filed Mar. 31, 2000, entitled METHOD AND SYSTEM FOR IDENTIFYING MANUFACTURING ANOMALIES IN A MANUFACTURING SYSTEM, which is also incorporated herein by reference. Data mining programs generally define a normal subset by classifying performance variables in an n-dimensional space. Correlations may be detected by the data mining methods described therein to produce the second analysis results.

The warning notification subsystem 185 may be adapted, for example, to generate the warning notifications based on the one or more cost or quality factors meeting a threshold. The warning notification subsystem 185 may, for example, provide a warning to the user 196 if the average cost of purchasing a component exceeds $2.00 over a period of time. The user 196 may then provide configuration data 192 using the management dashboard 170 to configure the second analysis tool 166 to find out if there is any correlation between other factors, such as a correlation between a change in supplier and the excessive cost of the component. The second analysis tool 166 runs a data mining algorithm to produce the second results 169 through data path 168. The second analysis results 169 have the answer resulting from the user's data mining request.

The warning notification subsystem 185 may alternatively generate the warning notifications to the user 196 based on the one or more operational metrics meeting a threshold. For example, the first analysis tool 164 may produce first results 154 that show that the operational metric of lead time indicates that the average lead time for shipping to an OEM has exceeded 2 weeks. The user 196 may then provide configuration data 192 using the management dashboard 170 to configure the second analysis tool 166 to find out if there is any correlation between other factors, such as a change in a product or component warehouse storage facility used for shipping and the excessive lead time for delivery. The second analysis tool 166 runs a data mining algorithm to produce the second analysis results 169 through data path 168.

The first analysis results 154 comprising operational metrics or cost or quality factors may be incorporated in the management dashboard 170 for providing product lifecycle management information to the user 196. The dashboard 170 may consist of a processor display on which the user 169 may view the first analysis results 154, which may be initially stored in the operational data store 150, and then presented on the management dashboard 170 when the user 196 desires.

The atomic-level data store 110 may receive data on component information 120, configuration information 125, and field information 130 from various parties involved throughout the lifecycle of the product. Such parties include, but are not limited to, one or more of vendors 140, suppliers 141, original equipment manufacturers (OEM) 142, assembly manufacturers 143, field service providers 144, service call centers 145, sales entities 146, and consumers 147. Each of these parties 140 through may provide data on various information 120, 125, or 130 to the atomic-level data store 110. Data on the various information 120, 125, or 130 are initially captured as detailed, or atomic level data 112, and inputted into the atomic-level data store 110. The atomic-level data store 110 is a data warehouse that monitors and organizes the detailed data 112 inputted into the atomic level data store 110. Component information, for example, in the detailed data 112 may thus comprise one or more of supplier information, original equipment manufacturer information, component list information, manufacturing environment information, lot data, test results, picking data, packaging data, and shipping data. The configuration information may further comprise one or more of hardware-hardware configuration information, hardware-software configuration information, and software-software configuration information. The field information may comprise one or more of field-test information, warranty information, repair information, technical support information, and technical service information. Thus, the operational metrics or cost or quality factors 154 produced by the first analysis tool 164 may relate to one or more stages of the product lifecycle, said stages comprising one or more of: design, manufacture, storage, assembly, configuration, shipping, delivery, handling, sales, support, and customer use.

The query engine 162 may comprise one or more query engines made by TANDUM or ORACLE, or one that is customized using C++ or other $3^{rd}$, $4^{th}$, or $5^{th}$ generation language capable of database or data warehouse operations. The query engine performs specific queries against the atomic level data store at specific times during a day, week, month or quarter year to produce the data subsets 152 on which the first analysis tool 164 performs analysis.

In addition to, or as part of, the first analysis results 154, the first analysis tool 164 may be adapted to generate one or more of: product management analysis, process management analysis, service supplier analysis, management analysis, component supplier analysis, warranty analysis, maintenance analysis, and forecasting analysis from the operational data store 150 or atomic level data store 110. Such analysis, known to those skilled in the art of manufacturing, may be generated either from the detailed, or atomic level, data 112, or from the first analysis results 154. For example, the supplier analysis may include an average lead time between ordering a component from a supplier 141 and delivery of the component to an OEM 142 calculated from the detailed data 112.

The first analysis results 154 may comprise one or more data models. The data models are derived by the first analysis tool 164 based on at least a portion of the data from the atomic level data store 110. The first analysis tool 164 creates one or more data distribution models. A data distribution model comprises a representation of the portion of the data from the atomic level data store 110 in a form other than atomic level detail data 112. Such a model is described in U.S. patent application Ser. No., 09/596,635, filed Jun. 19, 2000, titled METHOD AND SYSTEM FOR AGGREGATING DATA DISTRIBUTION MODELS, which is incorporated herein by reference. The operational metrics or cost or quality factors may be represented in the data distribution model. For example, a mean value of cost of a component over time may be calculated from the data model by extracting the mean value from the data model. Other values such as outliers, may be calculated. For example the warning notification subsystem 185 may send a warning signal to the user 196 if the yield for one or more component suppliers is shown to lie outside the $75^{th}$ percentile of all other component suppliers. The user 196 may, as a result, decide to perform a data mining algorithm against the detailed data 112 to find a correlation between the outlying supplier and other data in the atomic level data store 110.

The operational data store 150 may comprise a relational database such as that made by ORACLE, DBASE of Vestal, N.Y. 13850, or IBM. When the query engine 162 extracts subset 152 of detailed data 112 from the atomic level data store 110, the data is compiled and stored in relational format, as contrasted with a flat format in which the atomic level data store 110 may be stored in. One preferred system of querying the relatively flat data format typically found in data warehouses to produce the subset 152 which is stored in relational format may be found in U.S. patent application Ser. No., 09/608,085, filed Jun. 30, 2000, titled SYSTEM, METHOD AND COMPUTER PROGRAM PRODUCT FOR DATA MINING IN A NORMALIZED RELATIONAL DATABASE, which is incorporated herein by reference.

The operational metrics or cost or quality factors 154 may also comprise an aggregated data model, said aggregated data model being aggregated from two or more data models derived by the first analysis tool 164 based on subset 152. A plurality of data distribution models may be aggregated to arrive at one or more aggregated data models comprising the first analysis data 154. Creating data distribution models and aggregating a plurality of data distribution models is described in U.S. patent application Ser. No., 09/596,635, filed Jun. 19, 2000, titled METHOD AND SYSTEM FOR AGGREGATING DATA DISTRIBUTION MODELS, which is incorporated herein by reference. The user 185 may receive warning notifications from the warning notification subsystem 185, and perform analysis using the second analysis tool 166 as described with respect to the single non-aggregated data models above.

Component information 120 included in the data may comprise various data about the components and subcomponents that make up the product. Component information 120 includes, but is not limited to, supplier information, original equipment manufacturer information, component list, manufacturing environment information, lot information, test results, picking information, packaging information, and/or shipping information. They include, for example, component name, serial number, model, customer configuration code, date of manufacture, lot identification, and/or component genealogy. Test results, for example, include yields, reliability data, failure analysis, and/or material review reports.

Component information 120 may further include other information routinely available in the industry such as LRR (lot rejection rate) data, manufacturing ERP (enterprise resource planning) data, and IFIR (infant failure/infant reliability) data. LRR is information regarding the rate of rejection in a lot. LRR is generally used in conjunction with an incoming or outgoing quality sampling plan, where a small statistical sample test is used to determine the value of an entire lot of materials. Manufacturing ERP data generally refers to software packages that deal with demand planning, material planning, order entry, shipping, and invoicing. In larger enterprises, this is usually a canned software package provided by SAP, BAAN, or Oracle. IFIR is generally information that applies to an early life failure rate of a manufactured device.

Configuration information 125 includes various data regarding the configuration involved in producing the final product. Such information includes hardware-hardware configuration, hardware-software configuration, and software-software configuration. Hardware-hardware configuration describes the different hardware used in conjunction with other hardware. Hardware-software configuration describes the components of hardware used in conjunction with various software. Finally, software-software configuration describes the different combination of software used together. Because specific configuration combinations may lead to product failure, it is important to capture and maintain such data.

Further, field information 130 comprises one or more of field-test information, warranty information, repair information, technical support information, and/or technical service information. Such information may include, for example, serial number of the personal computer, product location (i.e., the zip code), incidence date, line of business, information about key component involved, failure code report, action reference, service performed, repair performed, component replaced, and/or the status of repair.

The management-and-operation subsystem 190 allows user 185 interaction through management dashboard 170, terminals 180, and warning notifications 185. Parties contributing data to the system may have access to the management-and-operation subsystem 190. Different information, however, is provided to different users 185 at various levels. A manager, for example, may be interested in baseline deviations among individual products or teams within the first analysis data 154, whereas an original equipment manufacturer 142 may be more interested in variances emerging in a certain component within the first analysis data 154. Access to information may selectively be controlled by using known data filters.

In operation, the dashboard 170 and processors 180 provide user interfaces for delivering information and for sending and receiving instructions. From the dashboard, for example, the first analysis data 154 may be generated by the first analysis tool 164, wherein the first analysis data 154 may be displayed on a regular basis to provide management with the ability to track operational metrics or cost or quality factors. When an operational metric or cost or quality factor is identified by a user 196 as evidencing a potential problem, second analysis data 169 may be produced using the second analysis tool 166, e.g. through data mining. Inefficiencies can be remedied by sending corrective instructions to, for example, production, design, engineering, suppliers 141, vendors 140, or assembler manufactures 143. The management dashboard 170 may provide visibility into data from, for example, a call center 145, field support 144, line operations, failure analysis, cost management, warranty cost tracking, quality goal reporting, and charge-back reporting, among others.

In addition, the management-and-operation subsystem 190 also comprises warning notification subsystems 185 for signaling when predetermined limits, or thresholds, are reached. Instead of constant supervision, the warning notification subsystem 185 allows notifications to be sent when a cost or quality factor or operational metric is identified in the system as a potential anomaly.

With reference to FIG. 2, a flow diagram illustrating a method performed by the system of FIG. 1 for improving management of quality and cost of a product throughout the product lifecycle of the product is shown. Atomic level, or detailed, data 112 is captured on component information 120, configuration information 125, and field information 130 from one or more parties involved throughout the product lifecycle, step 900. One or more subsets 152 are compiled from the atomic level data 112, step 902. Cost or quality analysis are performed on the subset 152 to determine first analysis results 154, step 904. The first analysis results 154 are provided to the user 196 for identifying patterns, associations or correlation in the first analysis results, step 906. Warning notifications based on the first analysis results 154 are delivered to the user 196, step 908. Based at least in part on the identified patterns, associations or correlation, configuration input 192 (or feedback data) is received from the user 196, step 910. Based on the configuration input 192, the detailed data 112 in the atomic level data store 110 is analyzed 168 to produce second analysis results 169, step 912. The second analysis results 196 are then presented, step 914.

In one embodiment, the warning notifications are based on the one or more of the operational metrics meeting a threshold, step 916. If the threshold is met, the warning notification is provided according to step 908. Otherwise, processing moves to step 910.

In step 900, said step of capturing atomic level data 112 may comprise receiving atomic level data 112 from parties involved throughout the product lifecycle, said parties comprising one or more of suppliers 141, original equipment manufacturers 142, assembly manufacturers 143, field service providers 144, call centers 145, sales entities 146, consumers 130 and vendors 140.

In step 912, said step of further analyzing the detailed data 112 comprises conducting one or more of: product management analysis, process management analysis, service supplier analysis, management analysis, component supplier analysis, warranty analysis, maintenance analysis, and forecasting analysis.

In an alternative method performed by the system for improving management of quality and cost of a product throughout the product lifecycle of the product of FIG. 1, a method for providing reiterative feed back (192 in FIG. 1) to the system from a user 196 is provided. The method comprises the steps of: capturing atomic level data 112 on component information 120, configuration information 125, and field information 130 from one or more parties 140–147 involved throughout the product lifecycle, step 900 in FIG. 2; compiling one or more subsets 152 of data from the atomic level data 112, step 902; performing cost or quality analysis on the subset to determine first analysis results 154, step 904; providing the first analysis results 154 to a user 196 for identifying patterns, associations or correlation in the first analysis results, step 906; delivering warning notifications (with warning notification system 185) based on the first analysis results 154, step 908; based at least in part on the identified patterns, associations or correlation, receiving feedback data 192 from the user, step 910; based on the feedback data 192, further analyzing detailed data in the atomic level data 112 to produce second analysis results 169, step 912; and presenting the second analysis results 196, step 914.

What is claimed is:

1. An analytical-decision support system for improving management of quality and cost of a product throughout the entire product lifecycle of the product, said system comprising:
   (a) an atomic level data store for collecting data on component information, configuration information, and field information;
   (b) a product-lifecycle-management analytics subsystem comprising:
      (i) a query engine for compiling subsets of data from the atomic level data store;
      (ii) a first analysis tool for performing cost or quality analysis on the subsets to determine first analysis results;
      (iii) a second analysis tool for analyzing detailed data in the atomic level data store to produce second analysis results;
   (c) a management and operation subsystem for presenting the first analysis results after the first analysis tool performs the cost or quality analysis, and for presenting the second analysis results after the second analysis tool analyzes the detailed data, the management and operation subsystem comprising:
      (i) a user interface for receiving configuration data from a user for configuring the second analysis tool; and
      (ii) a warning notification subsystem for delivering warning notifications based on the first analysis results.

2. The analytical-decision support system of claim 1, wherein the first analysis results are one or more operational metrics or one or more cost or quality factors.

3. The analytical-decision support system of claim 1, wherein the second analytical tool is a data mining tool.

4. The analytical-decision support system of claim 2, wherein the warning notification subsystem is adapted to generate the warning notifications based on the one or more cost or quality factors meeting a threshold.

5. The analytical-decision support system of claim 2, wherein the warning notification subsystem is adapted to generate the warning notifications based on the one or more operational metrics meeting a threshold.

6. The analytical-decision support system of claim 2, wherein said operational metrics or said cost or quality factors are incorporated in a management dashboard for providing product lifecycle management information.

7. The analytical-decision support system of claim 1, said atomic level data being supplied by parties involved throughout the lifecycle of said product, said parties comprising one or more of suppliers, original equipment manufacturers, assembly manufacturers, field service providers, call centers, sales entities, and consumers.

8. The analytical-decision support system of claim 2, said operational metrics relating to one or more stage(s) of the product lifecycle, said stages comprising one or more of: design, manufacture, storage, assembly, configuration, shipping, delivery, handling, sales, support, and customer use.

9. The analytical-decision support system of claim 2, said one or more cost or quality factors relating to one or more stage(s) of the product lifecycle, said stages comprising one or more of: design, manufacture, storage, assembly, configuration, shipping, delivery, handling, sales, support, and customer use.

10. The analytical-decision support system of claim 1, said component information comprising one or more of supplier information, original equipment manufacturer information, component list information, manufacturing environment information, lot data, test results, picking data, packaging data, and shipping data.

11. The analytical-decision support system of claim 1, said configuration information comprising one or more of hardware-hardware configuration information, hardware-software configuration information, and software-software configuration information.

12. The analytical-decision support system of claim 1, said field information comprising one or more of field-test information, warranty information, repair information, technical support information, and technical service information.

13. The analytical-decision support system of claim 1, wherein the first analytical tool is adapted to generate one or more of: product management analysis, process management analysis, service supplier analysis, management analysis, component supplier analysis, warranty analysis, maintenance analysis, and forecasting analysis from the operational data store or atomic level data store.

14. The analytical-decision support system of claim 2, said operational metrics comprising a data model of the compiled data, said data model being derived by the product-lifecycle-management analytics subsystem based on at least a portion of the data from the atomic level data store.

15. The analytical-decision support system of claim 2, said operational metrics comprising an aggregated data model, said aggregated data model being aggregated from two or more data models derived by the product-lifecyclemanagement analytics subsystem based on at least a portion of the data from the atomic level data store.

16. A method of improving management of quality and cost of a product throughout the product lifecycle of the product comprising the steps of:

capturing atomic level data on component information, configuration information, and field information from one or more parties involved throughout the product lifecycle;

compiling one or more subsets of data from the atomic level data;

performing cost or quality analysis on the subset to determine first analysis results;

providing the first analysis results to a user for identifying patterns, associations or correlation in the first analysis results;

delivering warning notifications based on the first analysis results;

based at least in part on the identified patterns, associations or correlation, receiving configuration input from the user;

based on the configuration input, further analyzing detailed data in the atomic level data to produce second analysis results; and presenting the second analysis results.

17. The method of claim 16, wherein the first analysis results are one or more operational metrics or one or more cost or quality factors.

18. The method of claim 16, wherein the step of further analyzing detailed data comprises mining data in the atomic level data.

19. The method of claim 17, wherein the warning notifications are based on the one or more of the operational metrics meeting a threshold.

20. The method of claim 16, said step of capturing atomic level comprising receiving atomic level data from parties involved throughout the product lifecycle, said parties comprising one or more of suppliers, original equipment manufacturers, assembly manufacturers, field service providers, call centers, sales entities, and consumers.

21. The method of claim 17, wherein said one or more operational metrics are determined based on atomic level data compiled from one or more stage(s) of the product lifecycle, said stages comprising one or more of: design, manufacture, storage, assembly, configuration, shipping, delivery, handling, sales, and customer use.

22. The method of claim 16, said component information comprising one or more of supplier information, original equipment manufacturer information, component list, manufacturing environment information, lot data, serial numbers, test results, picking data, packaging data, and shipping data.

23. The method of claim 16, said configuration information comprising one or more of hardware-hardware configuration information, hardware-software configuration information, and software-software configuration information.

24. The method of claim 16, said field information comprising one or more of field-test information, warranty information, repair information, return information, technical support information, and technical service information.

25. The method of claim 16, said step of further analyzing the detailed data comprising conducting one or more of: product management analysis, process management analysis, service supplier analysis, management analysis, component supplier analysis, warranty analysis, maintenance analysis, and forecasting analysis.

26. In a system for improving management of quality and cost of a product throughout the product lifecycle of the product, a method for providing reiterative feed back to the system from a user, the method comprising the steps of:

capturing atomic level data on component information, configuration information, and field information from one or more parties involved throughout the product lifecycle;

compiling one or more subsets of data from the atomic level data;

performing cost or quality analysis on the subset to determine first analysis results;

providing the first analysis results to a user for identifying patterns, associations or correlation in the first analysis results;

delivering warning notifications based on the first analysis results;

based at least in part on the identified patterns, associations or correlation, receiving feedback data from the user;

based on the feedback data, further analyzing detailed data in the atomic level data to produce second analysis results; and presenting the second analysis results.

* * * * *